2 Sheets—Sheet 1.
D. FRANK.
Car-Coupling.
No. 226,396. Patented April 13, 1880.
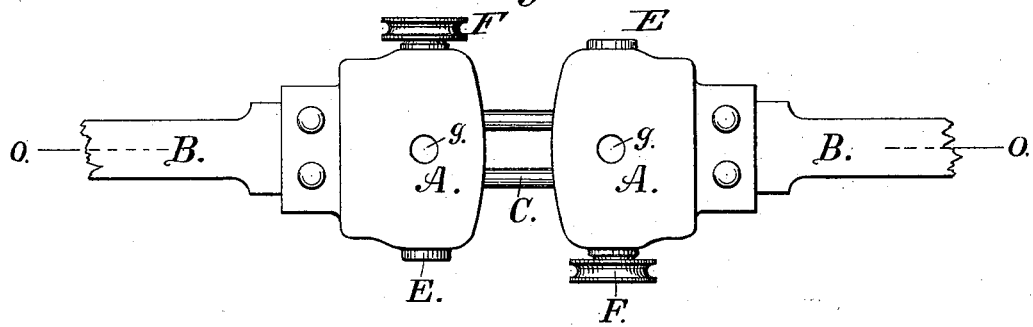
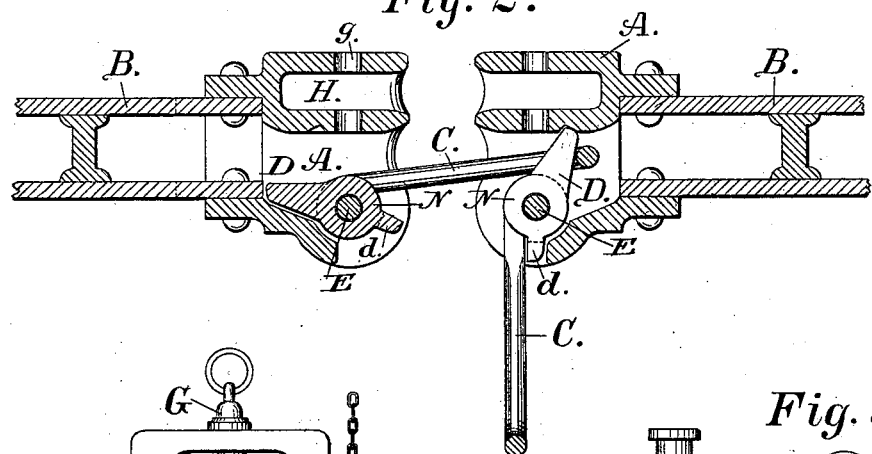
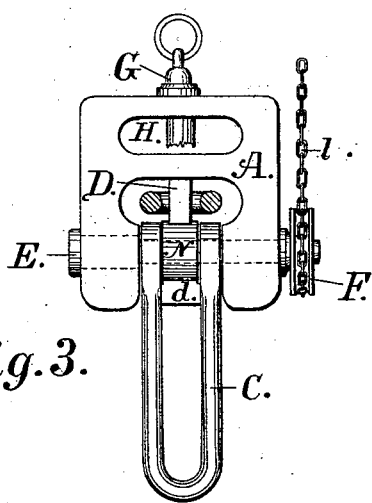
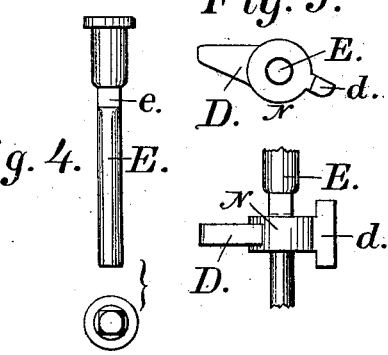
Witnesses:
John A. Ulrich.
Lewis S. Jacoby
Inventor:
David Frank 2 Sheets—Sheet 2.
D. FRANK.
Car-Coupling.
No. 226,396. Patented April 13, 1880.
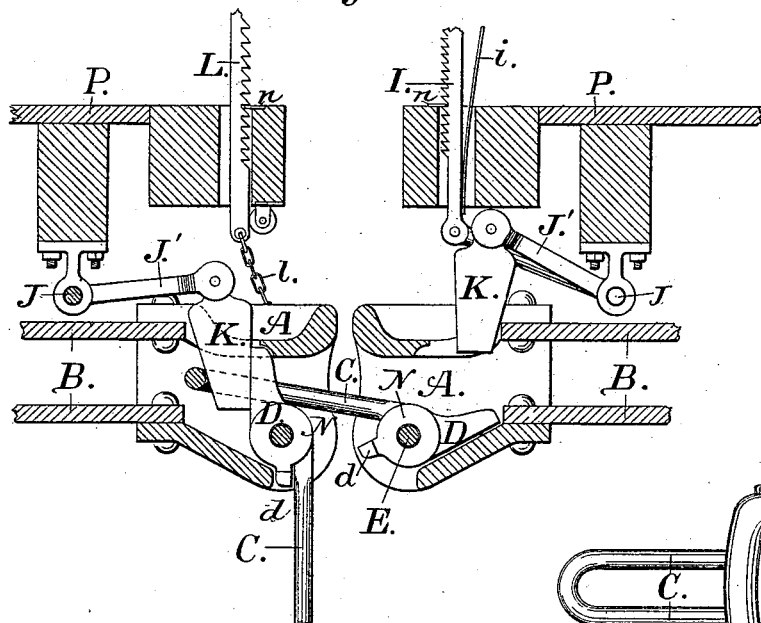
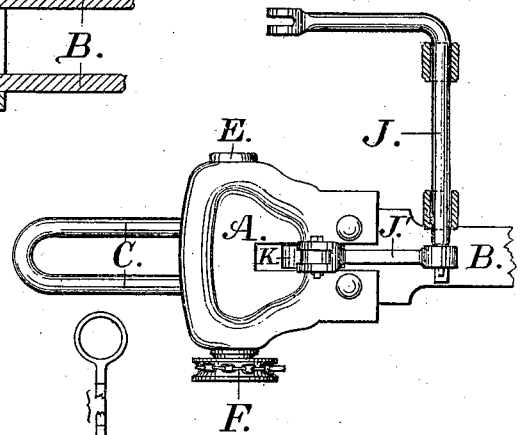
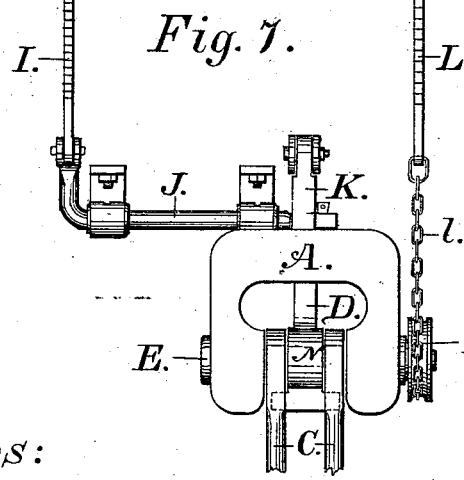
Witnesses:
John D. Uhrich
L. S. Jacoby
Inventor:
David Frank

UNITED STATES PATENT OFFICE.

DAVID FRANK, OF ALLENTOWN, PENNSYLVANIA.

CAR-COUPLING.

SPECIFICATION forming part of Letters Patent No. 226,396, dated April 13, 1880.

Application filed February 6, 1880.

*To all whom it may concern:*

Be it known that I, DAVID FRANK, of Allentown, in the county of Lehigh and State of Pennsylvania, have invented certain Improvements in Car-Couplings, of which the following is a specification.

My invention relates to car-couplings; and the invention consists in the novel construction, combination, and arrangement of devices used whereby the coupling and uncoupling can be effected by a person on the car or platform and thereby avoid the accidents which so frequently occur with the ordinary couplings hitherto in general use.

Figure 1 is a top-plan view; Fig. 2, a longitudinal vertical section on the line *o o* of Fig. 1, and Fig. 3 an end view of the draw-head of cars having my improvements applied thereto. Figs. 4 and 5 are detailed views of some of the parts, detached for the purpose of more clearly illustrating their construction. Fig. 6 is a longitudinal vertical section, Fig. 7 an end elevation, and Fig. 8 a top-plan view, of my improved coupling with an additional feature embodied.

In the drawings, A represents the draw-head, which may be made of cast or wrought iron, as preferred, and which is connected to the draw-bar B in any suitable manner. As shown in Figs. 1 and 2, this draw-head A is provided at its upper part with a recess, H, and holes *g*, to enable the ordinary coupling link and pin to be used, and thus enable a car having my improved coupling on it to be coupled to an ordinary car, or one not having the improved coupling on it. Immediately below this recess H, I provide another and larger recess in the end of the draw-head, as shown in Fig. 2, its lower wall being inclined or beveled at its rear portion and extending forward only about half the length of the head A, thus leaving a slot or opening at its front lower edge to permit the link C to hang vertical, as shown in Figs. 2 and 3. I then provide a bolt, E, of the form shown in Fig. 4, which is inserted transversely through holes in the lower portion of the head A, as shown in Figs. 1, 2, and 3, for the purpose of supporting the locking-dog D and the link C, the former being arranged to turn loosely on the bolt E, while the link, which is made in the form of an elongated clevis, is rigidly secured to the bolt E by causing one of its eyes at one end to fit snugly on the square portion *e* of said bolt, which portion *e* is shown in Fig. 4.

It is obvious that the link C may be secured to the bolt E in any suitable manner, the sole object of such connection being to enable the link to be raised to a horizontal position by rotating the bolt E, so as to bring the link into the proper position to enter the recess in the draw-head of the adjoining car when it is desired to couple the cars. To effect this rotation of the bolt, and thereby raise the link, I secure upon the projecting end of the bolt E, at one side of the draw-head, a pulley, F, as shown in Figs. 1, 3, 7, and 8, and to this pulley I attach one end of a chain, *l*, its opposite end being connected to a vertical handle, L, which has on one edge a series of ratchet-teeth, by which it can be made to engage with or hook on a plate, *n*, at the point where said handle extends up through a hole in the platform above or through any suitable guide which may be secured to the body of the car in the proper position, as represented in the left-hand portion of Fig. 6. It will readily be seen that by this means the attendant, while upon the platform, or even upon the top of a freight or box car, in case the handle be extended up high enough, can at any time raise the link C into the proper position for coupling the cars, and that thus all necessity of going between the cars to couple them and the attendant danger of so doing is entirely avoided.

The device with which the link C engages I term a "gravitating dog," it being shown in side elevation, and also in plan, in Fig. 5, as well as in position in the several other figures. This dog consists of a hub, having a central hole of the proper size to enable it to be slipped on the bolt E between the ends of the clevis-shaped link, as shown in Fig. 3, and it is provided on its rear side with a strong arm or lug, D, and on its opposite side with a short T-shaped arm, *d*, this latter being arranged to extend laterally at one or both sides under the arms of the link C, so that when the latter is released and permitted to hang free, as represented in Fig. 3, and also in the right-hand portion of Fig. 2, it will cause the dog to turn with the bolt E, thereby raising the arm D and causing it to enter and engage with the link C of the opposite car, which is supposed to have been shoved into the draw-head over the arm D. In case the opposite link has been properly adjusted and secured in the horizontal position and the first one allowed to hang free, in which case the arm D of the dog will be in the elevated position represented in the right-hand portion of Fig. 2, then, as the cars are brought together, the horizontal link, striking against the front side of arm D, will shove it back, while the link rides over it, and as soon as it has passed over it the weight of the suspended or free link will immediately return the arm D to its elevated position within the link C, thus automatically effecting the coupling of the cars.

It will be observed that the upper end of the arm D when raised is made to bear in a notch or recess in the wall above it, thus giving it a strong bearing or support when the cars are coupled. To uncouple the cars it is only necessary to bring them close together, so that the end of the link will be shoved inward away from the arm D, which being much heavier than the arm $d$ will cause it to fall over back the moment it is relieved from the pressure of the free or suspended link, which is drawn up by the handle L for that purpose, when the cars are free to be separated.

Thus far I have described my improved coupling as it would be applied to freight-cars; but in passenger-cars it is desirable that the cars when coupled shall be held close together, and to accomplish this result I add the wedge K, as shown in Fig. 6. As there shown, this wedge K is pivoted to the front end of an arm, J', which is rigidly secured to a rock-shaft, J, which is mounted in suitable bearings, as represented in Figs. 6, 7, and 8, so that said wedge K can be moved vertically up and down through a slot in the top of the draw-head A, and when the cars are brought close together can be forced down between the back side of the arm D and the bend of the link C, thereby holding the cars close together. In order to raise this wedge K, as is necessary to uncouple the cars, the rock-shaft J is provided at its outer end with a crank-arm, to which is pivoted a handle, L, (shown in the right-hand portion of Fig. 6, and at the left-hand of Fig. 7 also,) said handle L being provided on its face with a series of ratchet-teeth and on its back with a spring, $i$, by which it can be made to engage with a plate, $n$, on the platform, and thus be made to hold the wedge K either up or down, as may be desired.

It is obvious that this wedge device K may be operated by other means than the rock-shaft, and be made to operate in the same way, and also that it may be used with my improved coupling on other than passenger-cars if desired, and therefore I do not desire to be understood as limiting myself to its use on passenger-cars.

From the foregoing description the operation of the devices will be readily understood, and therefore any further description is deemed unnecessary.

I am aware that a combined link and pin so constructed that both necessarily moved together as one piece has before been shown and described, and therefore I do not claim such a device; but What I do claim is—

1. The combination of the link C, rigidly secured to the bolt E, the gravitating dog with its arms D and $d$, and pulley F, with the chain $l$, and notched handle L, all constructed and arranged to operate substantially as shown and described.

2. In combination, with the link C and the gravitating dog, the wedge K, connected to the spring-ratchet handle L by means of the rock-shaft J, and arm J' or equivalent means for operating the same, substantially as and for the purpose set forth.

DAVID FRANK.

Witnesses:
N. H. BIEBER,
EDWARD RUHE.